United States Patent
Borsum et al.

(10) Patent No.: US 7,724,714 B2
(45) Date of Patent: May 25, 2010

(54) METHOD FOR PROCESSING DATA PACKETS RECEIVED VIA A FIRST INTERFACE AND DEVICE FOR CARRYING OUT THE METHOD

(75) Inventors: Malte Borsum, Hannover (DE); Klaus Gaedke, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 685 days.

(21) Appl. No.: 10/939,853

(22) Filed: Sep. 13, 2004

(65) Prior Publication Data

US 2005/0063405 A1    Mar. 24, 2005

(30) Foreign Application Priority Data

Sep. 19, 2003   (DE) ............................... 103 43 458

(51) Int. Cl.
*H04W 4/00*      (2009.01)
*H04B 7/212*     (2006.01)
*H04L 12/28*     (2006.01)
*H04L 12/56*     (2006.01)

(52) U.S. Cl. ................ 370/338; 370/321; 370/394

(58) Field of Classification Search ............... 370/321, 370/389, 394, 419, 442, 461, 462, 338; 710/100, 710/306
See application file for complete search history.

(56) References Cited

U.S. PATENT DOCUMENTS 3,879,580 A * 4/1975 Schlosser et al. ............. 370/324
5,642,355 A * 6/1997 Smith .......................... 370/337

(Continued)

FOREIGN PATENT DOCUMENTS

EP   0999671 A2 * 5/2000

(Continued)

OTHER PUBLICATIONS

ETSI: "Broadband Radio Access Networks (BRAN); HIPERLAN Type 2; Packet based Convergence Layer; Part 4: IEEE 1394 Bridge Specific Functions sub-layer for restricted topology" ETSI TS 101 493-4 V1.1.1 Jul. 2001.*

(Continued)

*Primary Examiner*—Lester Kincaid
*Assistant Examiner*—Nathan Mitchell
(74) *Attorney, Agent, or Firm*—Robert D. Shedd; Paul P. Kiel; Guy H. Eriksen

(57) ABSTRACT

During the transmission of data packets received on a wired connection via a first interface via a second interface designed for the wireless transmission of data, the problem exists that between receiving the data and transmitting the data via the second interface a relatively large delay time can arise which must be bridged by means of a suitably dimensioned buffer memory. To enable the maximum delay time to be further reduced, the necessary processing of the received IEEE 1394 bus packets is already performed section by section immediately after a received data packet has arrived. After the complete number of bus packets falling within a transmission frame has been received, there is therefore no longer any lengthy processing time required and the probability of missing the time slots reserved in the next transmission frame is significantly reduced. The buffer memory for bridging the delay time period can therefore be correspondingly smaller.

11 Claims, 5 Drawing Sheets

U.S. PATENT DOCUMENTS

| | | | |
|---|---|---|---|
| 5,805,816 A * | 9/1998 | Picazo et al. | 709/223 |
| 5,872,784 A | 2/1999 | Rostoker et al. | 370/395 |
| 6,011,820 A * | 1/2000 | Rosengren | 375/354 |
| 2001/0002195 A1* | 5/2001 | Fellman et al. | 370/420 |
| 2002/0085565 A1 | 7/2002 | Ku et al. | 370/395.42 |
| 2002/0100052 A1 | 7/2002 | Daniels | 725/87 |
| 2003/0026287 A1* | 2/2003 | Mullendore et al. | 370/442 |
| 2003/0123427 A1 | 7/2003 | Gaedke et al. | 370/349 |
| 2005/0271059 A1* | 12/2005 | Young et al. | 370/389 |
| 2007/0019674 A1* | 1/2007 | Bourlas et al. | 370/466 |

FOREIGN PATENT DOCUMENTS

| | | |
|---|---|---|
| WO | WO 99/04340 | 1/1999 |
| WO | WO 01/06718 A1 | 1/2001 |
| WO | WO0189152 A2 * | 11/2001 |
| WO | WO 03/026223 A1 | 3/2003 |

OTHER PUBLICATIONS

ETSI TS 101 493-3 v 1.2.1; Dec. 18, 2001, pp. 12 and 69.*

* cited by examiner

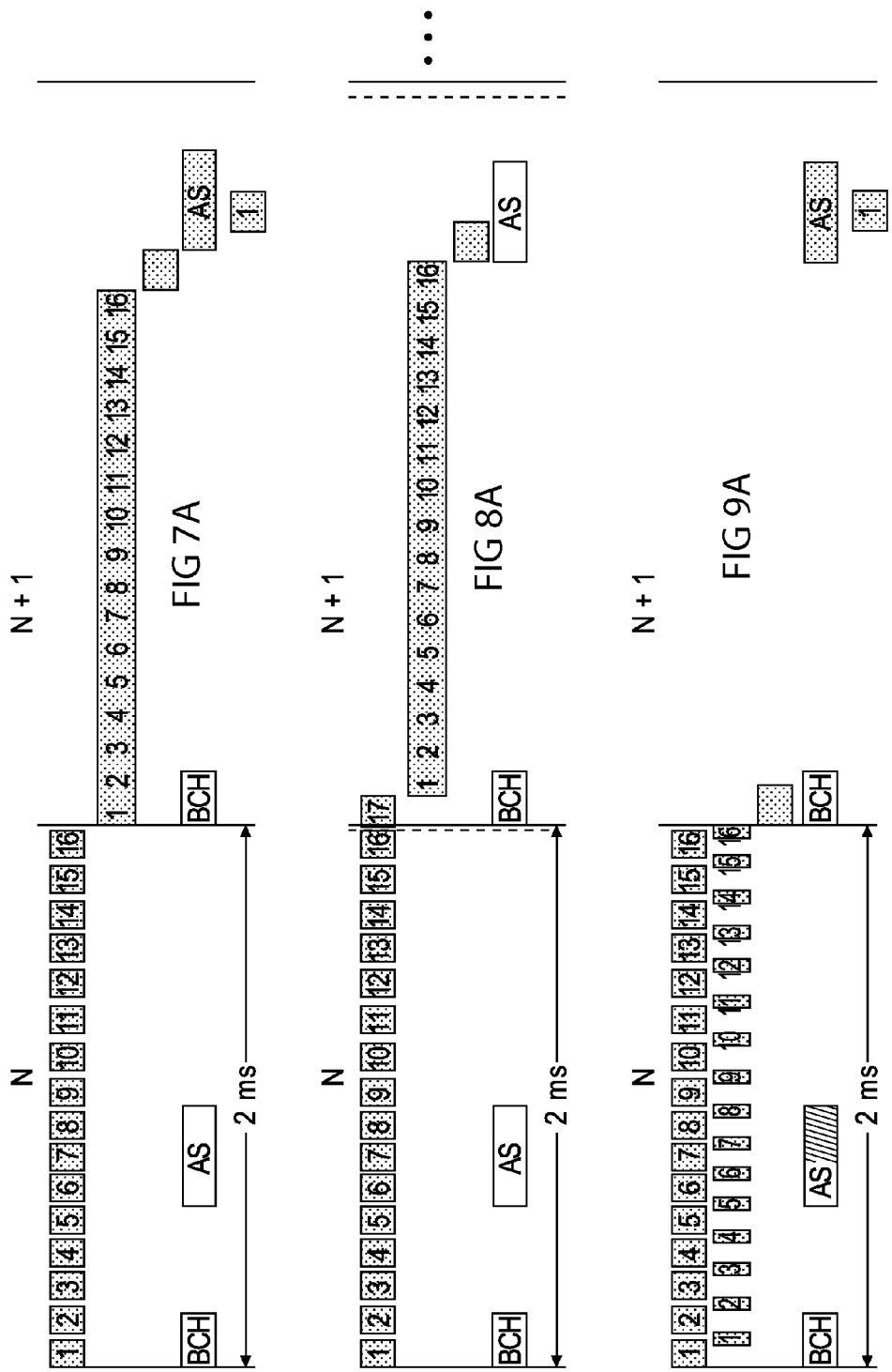

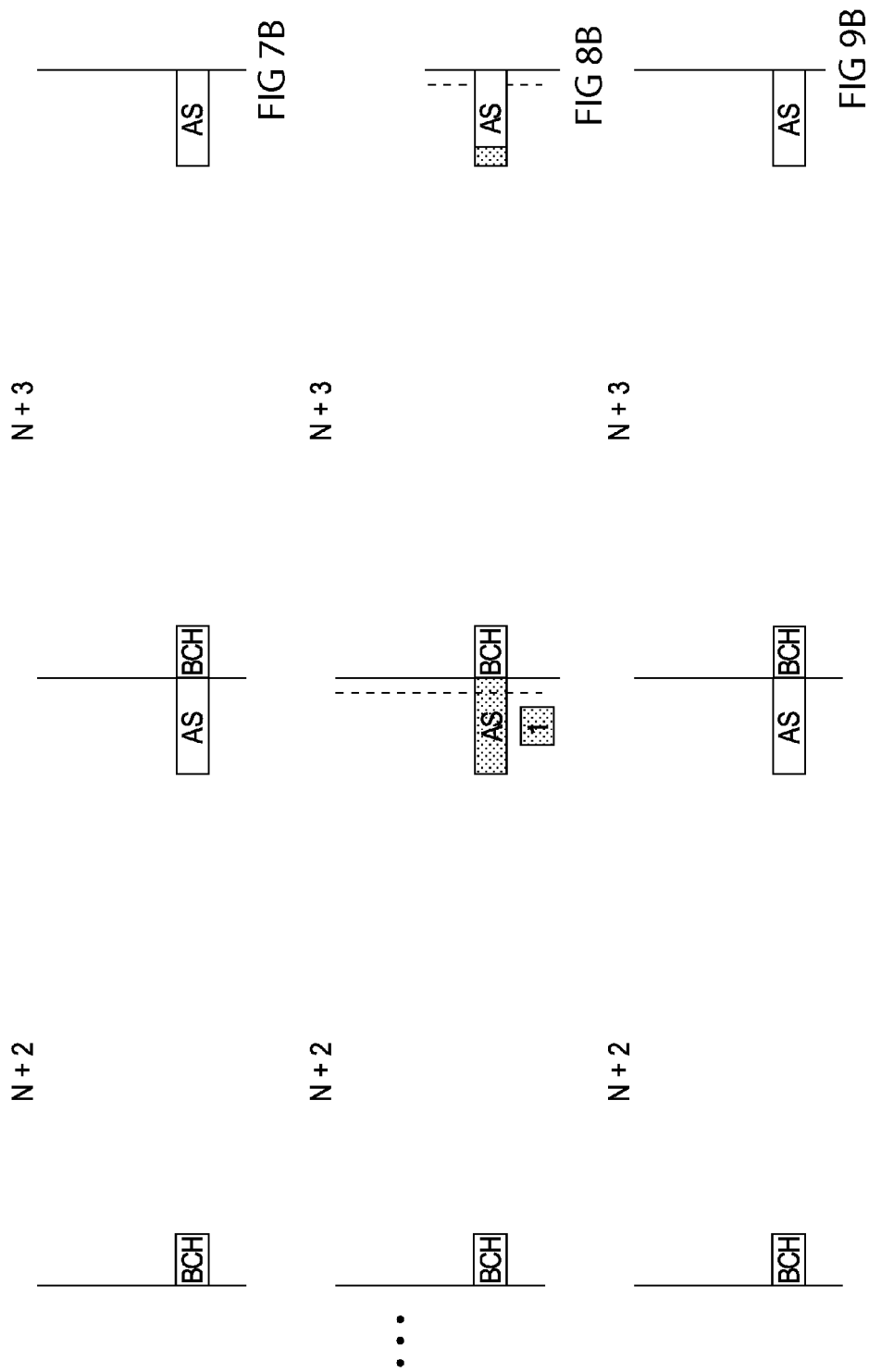

METHOD FOR PROCESSING DATA PACKETS RECEIVED VIA A FIRST INTERFACE AND DEVICE FOR CARRYING OUT THE METHOD

This application claims the benefit, under 35 U.S.C. 119 of German Patent Application 10343458.5, filed Sep. 19, 2003.

The invention relates to the technical field of digital data communications, to be precise in such a way that data is received in packets via a first interface, is converted into the format according to a second interface, and is output via the second interface.

BACKGROUND OF THE INVENTION

Devices in the home, such as typical home entertainment equipment for example, particular mention also being made of a personal computer which nowadays can also be considered home entertainment equipment, or also other household devices, for example "white goods" appliances, are increasingly being networked. This networking encompasses not only systems in which the devices are networked by means of wires, that is to say with appropriate cable connections between the devices, such as with the aid of the IEEE 1394 bus system for example, but also systems in which the devices are wirelessly networked. Particular mention is made at this point of the so-called HIPERLAN/2 system which has become established alongside the IEEE 802.11x system. The HIPERLAN/2 system enables the networking of devices in the home. It provides a number of approximately 20 MHz wide channels in the 5 GHz range, which in turn are subdivided according to a TDMA method (Time Division Multiplex Access).

The modulation method corresponds to an OFDM method (Orthogonal Frequency Division Multiplex), so that the least possible interference occurs during multipath receiving. The maximum data rate is in the range of 54 Mbit/s. Video data streams and audio data streams can consequently be transmitted in the HIPERLAN channels.

The HIPERLAN system has already been specified in an ETSI/BRAN standard. An overview of the system may be found in the document ETSI TR 101 683 V1.1.1 (2000/02) Broadband Radio Access Network (BRAN); HIPERLAN Type 2; System Overview. The key component for the invention is described in the document ETSI TS 101 493-1 V1.1.1 (2000/04); Broadband Radio Access Networks (BRAN); HIPERLAN Type 2; Packet Based Convergence Layer; Part 1 and Part 3. Further components of the system, such as the physical layer and data link control layer (DLC) in particular, are published in other documents. These may all be obtained from the European Telecommunications Standards Institute in F-06921 Sophia-Antipolis Cedex, France.

For networking devices in the home, one scenario which uses a combination of both networking systems, namely firstly wired and secondly wireless, has proved to be expedient. If data between the two different systems is also to be exchanged among the systems, a bridge circuit is consequently required for this purpose; on the one hand said circuit is therefore connected to the wired system and on the other hand it also has an interface to the wireless transmission system. Such a bridge circuit is therefore equipped with two interfaces, firstly for the wired transmission system and secondly for the wireless transmission system.

The invention relates to such a bridge unit. In particular, the invention solves a problem that occurs when the IEEE 1394 bus system is used as the wired system and the aforementioned HIPERLAN/2 system is used as the wireless transmission system. A separate specification was created for this application. This is called ETSI TS 101 493-3 V1.1.1 (2000/09); Broadband Radio Access Networks (BRAN); HIPERLAN Type 2; Packet Based Convergence Layer; Part 3; IEEE 1394 Specific Convergence Sublayer (SSCS). It is described in Annex C.3 of the aforesaid document that the maximum transmission delay with isochronous data transmission from the IEEE 1394 bus system into the HIPERLAN/2 system is 6.1 ms. Accordingly, 2.1 ms of this arises from the fact that in the worst case it is necessary to wait first for 17 IEEE 1394 bus packets to arrive before the data for a MAC transmission frame (Medium Access Control) has been collected. A further 2 ms time delay can arise from the fact that the time slots reserved for the station are available just when the received data needs to be made available by the DLC layer for transmission. In the extreme case, it is then necessary to wait for the next MAC transmission frame. 2 ms of delay time can thus also arise if the transmission frame was newly divided just at the moment when the data is available, and afterwards the time slots allotted to the station are positioned at another point of the MAC transmission frame.

In order to bridge this delay time, it is therefore necessary to implement a correspondingly large buffer memory in the bridge circuit. It is even recommended to dimension the buffer memory to be so large that even the delay time of 8 ms can still be buffered.

SUMMARY OF THE INVENTION

The object of the invention is to reduce the maximum delay time between data arrival and data transmission.

The problem is solved in that the necessary reformatting for the transmission of the data via the second interface is performed section-by-section and not, as proposed in the standard, after the last data arriving in the time-slot pattern of a HIPERLAN transmission frame has been received. When the last data to be transmitted has arrived, most of the processing of this data has already been completed, so that it is then only necessary to process a smaller section of data. This then no longer requires as much processing time and the maximum possible delay time is reduced to 4.1 ms. The measure thus has the advantage that a much smaller buffer memory must be implemented, since the maximum delay time to be buffered is reduced.

Other advantageous measures and further developments of the method according to the invention are set out in the dependent claims. One particularly advantageous measure is, if a reserved time slot in a transmission frame has been missed, to fill up the still available remaining reserved time slots of said transmission frame with the reformatted data that is already available. The time slots of the transmission frame that have not yet been missed are therefore not simply allowed to pass by uselessly, in that so-called "dummy data" is inserted into them, but rather they are filled with already processed payload data which then does not need to be transmitted again in the next transmission frame.

Another advantageous measure consists of using a time-slot pattern that has been advanced by a given amount instead of the time-slot pattern of the transmission frame for internal processing of the received data packets. By virtue of this measure it is possible to avoid such a large additional time delay, arising because of slight deviations in the clock signals for the two different interfaces as a result of receiving a further data packet via the first interface, that the first reserved time slot in the next transmission frame is missed for the transmission of the data. If the reserved time slots are situated in the latter part of the transmission frame, there is no risk of said time slots being missed. The problem exists primarily when the reserved time slots are positioned in the front part of the frame, that is to say in particular whenever they are the first permitted reservable time slots. By advancing the internal processing time, it is however necessary to increase the size of the buffer memory again slightly so that the advance time can also be buffered.

Advantageous measures for a device for carrying out the method are set out in Claims 7 to 12.

BRIEF DESCRIPTION OF THE DRAWINGS

Exemplary embodiments of the invention are described in greater detail in the description below and are illustrated in the drawings, in which:

FIG. 7 shows a representation of the normal case of data processing, as proposed in the standard;

FIG. 8 shows a representation of data processing in the special case where receiving a seventeenth data packet begins already during the transmission frame;

FIG. 9 shows a representation of the section-by-section processing of the received data packets according to the invention.

DETAILED DESCRIPTION OF PREFERRED EMBODIMENTS

Figure 1:
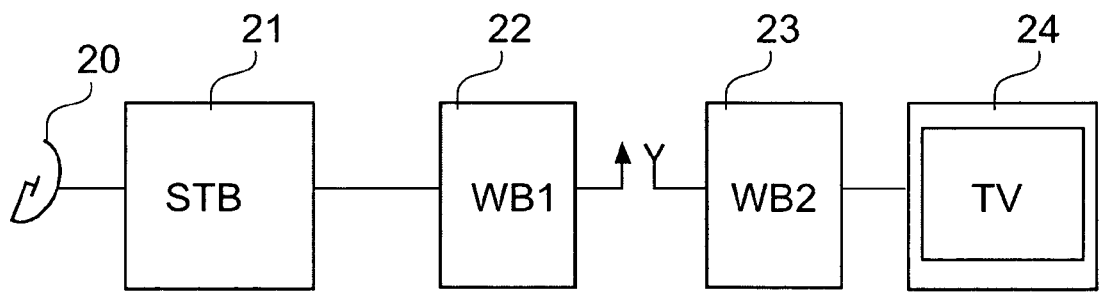
FIG. 1 shows an application of the invention with a set-top box and a television set.

FIG. 1 shows the application of data transmission from a set-top box for digital television which is located in one room to a television in another room. The digital television signals are fed to the set-top box 21 via a satellite receiving antenna 20. Said set-top box forwards the received data stream to a transmitting unit 22 located in the room, which is often also referred to as a wireless box (WB) and represents a bridge to the wireless transmission system. The transmitting unit 22 is connected to a transmitting antenna, via which it emits the data stream (it can include video and audio data) wirelessly by means of electromagnetic waves. The radio signals are received by a second wireless box, for example one located in another room, namely by the receiving station 23, which is equipped with a receiving antenna for this purpose. The receiving unit 23 has a wired connection to a television set 24, which is likewise internally equipped with a decoding unit for digital television signals that decodes the received video and/or audio signals and forwards them for displaying or for output over the loudspeakers respectively.

In the application illustrated, it is assumed that the wireless transmission of the data takes place in compliance with the so-called HIPERLAN/2 transmission system. The transmitting and receiving units are accordingly designed in accordance with said transmission system. The HIPERLAN/2 transmission system is designed to transmit data at up to 54 Mbit/s in the 5 GHz range. As described in the introduction, the HIPERLAN/2 transmission system is standardized and accordingly is described in detail in the associated description sections of the standard. For the disclosure of the invention, therefore, reference is expressly made to the standard. Reading of the following sections is particularly recommended:

ETSI TR 101 683 V1.1.1 (2000/02) Broadband Radio Access Network (BRAN); HIPERLAN/2 System Overview ETSI TS 101 493-1 V1.1.1 (2000/04) Broadband Radio Access Networks (BRAN); HIPERLAN/2; Packet Based Convergence Layer; Part 1: Common Part, and ETSI TS 101 493-3 V1.1.1 (2000/09) Broadband Radio Access Networks (BRAN); HIPERLAN/2; Packet Based Convergence Layer; Part 3: IEEE 1394 Service Specific Convergence Sublayer (SSCS).

Figure 2:
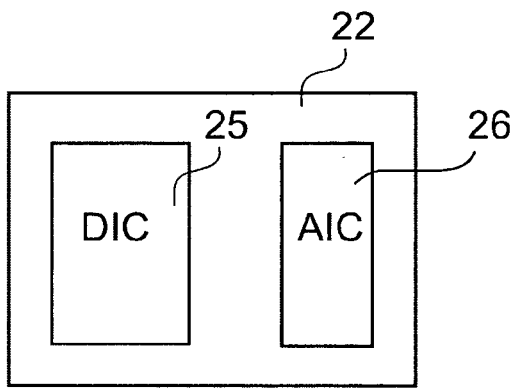
FIG. 2 shows an outline block circuit diagram of a bridge circuit for connecting a wired and a wireless transmission system.

FIG. 2 shows an outline block circuit diagram of the transmitting unit 22. This block circuit diagram shows on the one hand a digital IC 25 and on the other hand an analog IC 26. The digital IC 25 contains the component for preprocessing the data for the wireless transmission. Said IC will be discussed in greater detail below. The analog IC 26 represents a front-end IC in relation to the air interface. Located in this part are the transmission amplifier and the means for generating the HF signals that are then forwarded to the transmitting antenna.

Figure 3:
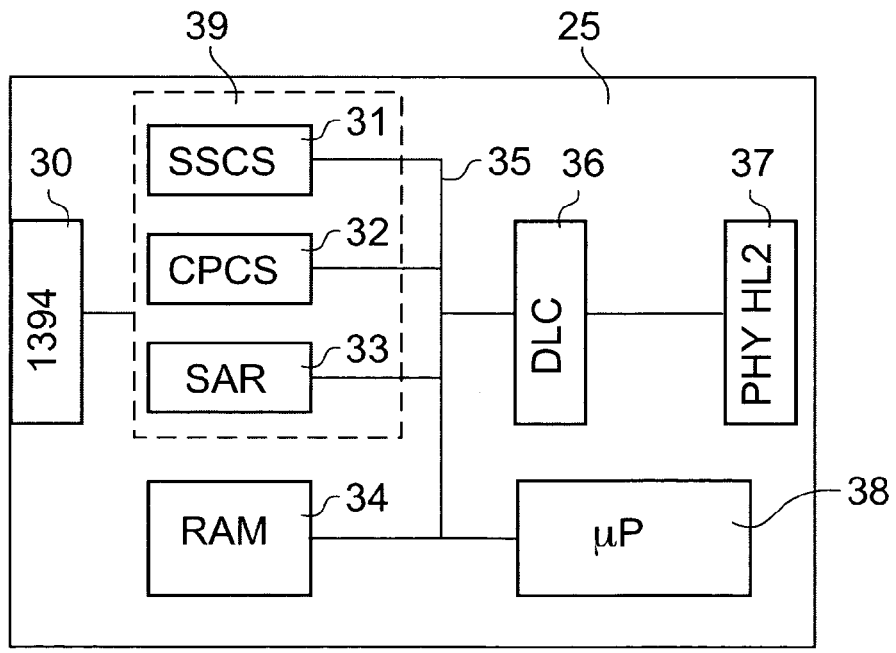
FIG. 3 shows a block circuit diagram of the digital IC in the bridge circuit.

FIG. 3 shows an outline block circuit diagram of the digital IC 25. Reference numeral 30 designates a part of an IEEE 1394 interface. This part corresponds to the data link control layer of the IEEE 1394 bus system. Several different ICs are commercially available to implement the IEEE 1394 data link control layer, which are also sold as IC cores and thus can also be integrated in a larger digital circuit. The digital IC 25 is additionally equipped with three components which together form the so-called packet-based convergence layer according to the HIPERLAN/2 standard. These components are SSCS 31 (service-specific convergence sublayer), CPCS 32 (common part convergence sublayer) and SAR 33 (segmentation and reassembly). All three components will be described in greater detail below. Said three components are all connected via an internal data bus 35 to further units. These include on the one hand a memory unit 34 (RAM), a microprocessor unit 38 and a block DLC 36 which is provided for implementing the data link control layer provided in the standard for the HIPERLAN/2 interface. Finally, connected downstream of the DLC block 36 is a block 37 for implementing the bit transmission layer—that is to say the physical layer of the HIPERLAN/2 transmission system. Further units, such as a unit for calculating an error correction code for example, may also be integrated in the digital IC 25, but are not explained in greater detail below. It is possible to use an AMBA bus, for example, as an internal data bus 35.

Figure 4:
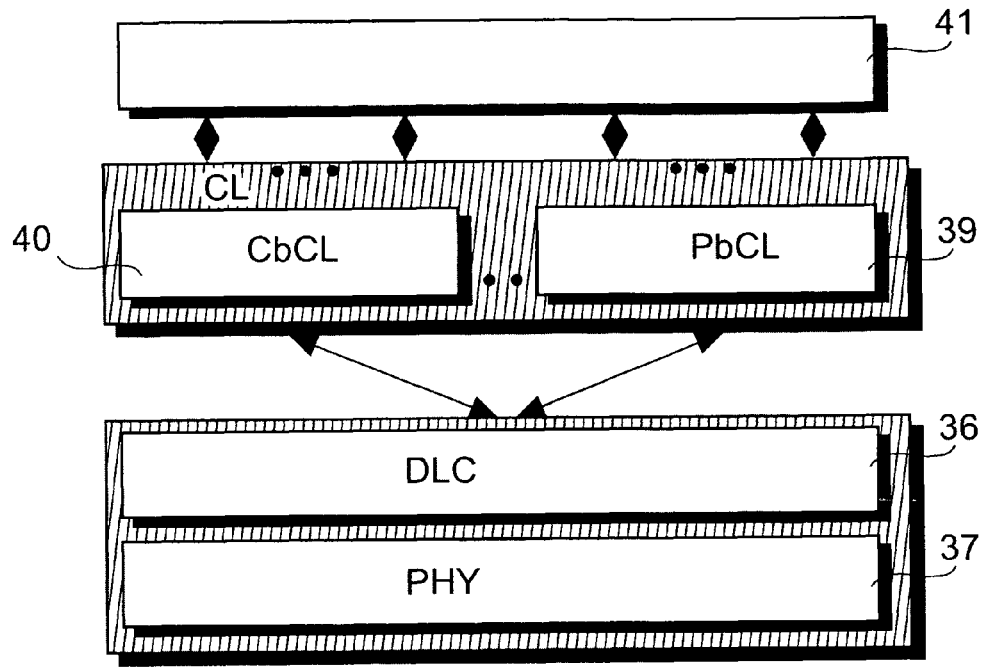
FIG. 4 shows a layer model for the bridge circuit.

The block division for the digital IC 25 is an expression of the layer model with a so-called convergence layer which is provided in the HIPERLAN/2 standard and shown in FIG. 4. The reference numeral 37 designates the physical layer of the HIPERLAN/2 system. Accordingly, the reference numeral 36 designates the data link control layer (DLC). The aforementioned layer PBCL (packet-based convergence layer) is denoted by reference numeral 39. The HIPERLAN/2 system is also open for the transmission of data in so-called smaller units that are referred to as cells, for example transmission in accordance with the ATM standard. In this case, a so-called cell-based convergence layer 40 would be implemented. Reference numeral 41 designates the higher layers.

Figure 5:
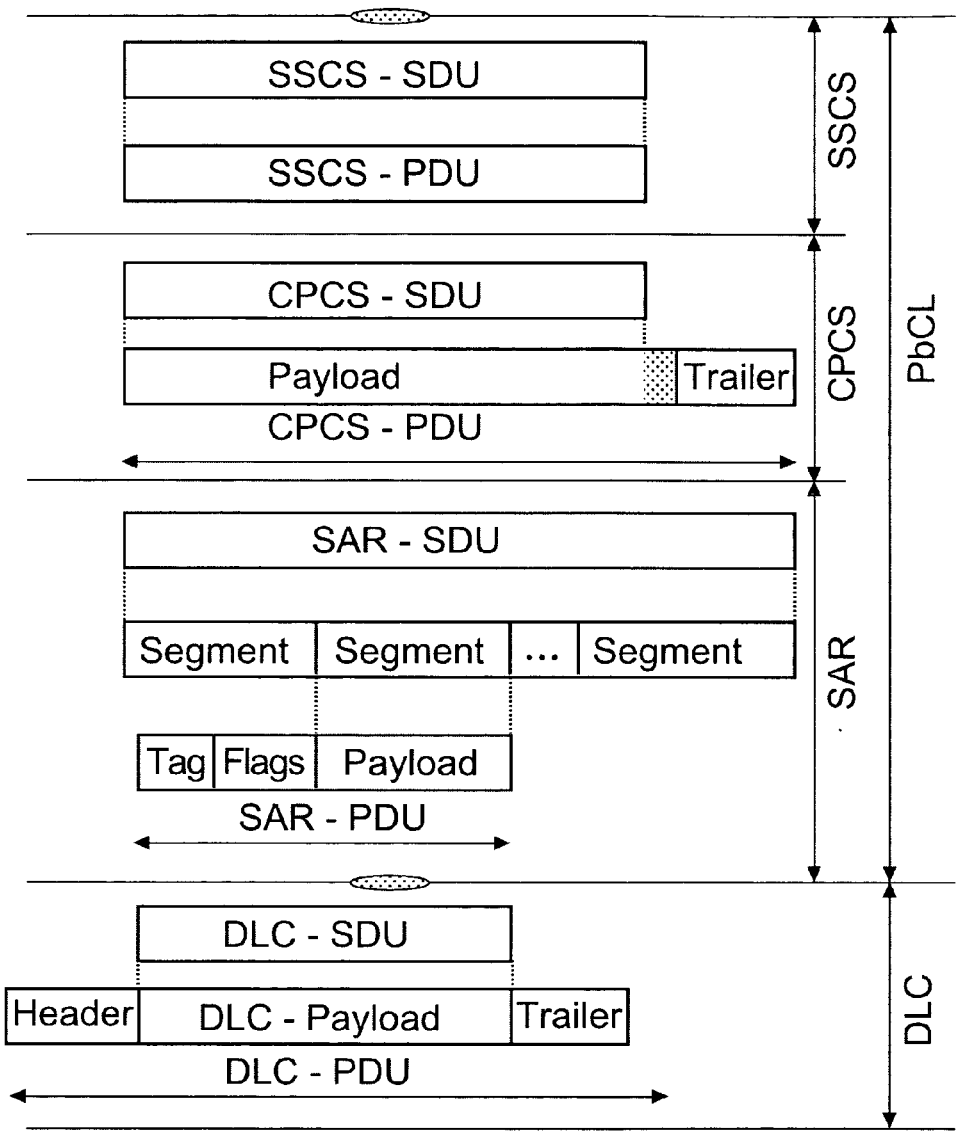
FIG. 5 shows a representation of the individual processing steps for the reformatting of the data from the IEEE 1394 data packet format into the HIPERLAN/2 data packet format.

FIG. 5 shows part of said layer model again, but the division of the packet-based convergence layer into three different sublayers is additionally represented and the processing steps that take place in the respective layers are illustrated. The data received via the 1394 interface 30 in accordance with FIG. 3 is collected in the RAM 34. After a data packet has arrived in the RAM 34, said data is first processed in the SSCS block 31. In this block, the received IEEE 1394 data packets assembled as a service data unit (SDU) are converted into a so-called protocol data unit (PDU). This conversion does not change the size of the assembled data block (see FIG. 5). However, an updating or recalculation of certain parameters is performed. Such parameters are, for example, time information for synchronization between the IEEE 1394 clock signal and the relevant clock signal for the HIPERLAN/2 system. In this respect, reference is made to the description in the standard for details, see the cited document ETSI TS 101 493-3 V1.1.1 (200/09).

The data converted in this way is subsequently processed in the CPCS block 32. As shown in FIG. 5, the data that has arrived, which is now designated CPCS-SDU, is organized in this sublayer. This is done by appending so-called "padding data" at the end of the data unit and appending finally a concluding information item, which is referred to in the standard as a trailer. This can also be seen in FIG. 5. As many padding bits are appended until the resulting data unit CPCS-PDU has a length of an integral multiple of 48 bytes. In the concluding information (trailer), it is then entered how much payload data is included in the protocol data unit. The resulting data unit is subsequently processed in the SAR block 33. In accordance with the HIPERLAN/2 standard, when it enters said sublayer the data unit is termed the SAR-SDU data unit (FIG. 5). The data unit is segmented in this layer. The SAR layer is designed to process SAR-SDUs that have a variable length, however with the restriction that it must be an integral multiple of 48-byte data blocks. As a result of the segmenting, the data unit SAR-SDU is divided into 48-byte segments. A control information item of 12 bits is set at the beginning of a data segment. Apart from the SAR stop bit, said added control information is however reserved for future applications and otherwise has no control function.

Figure 6:
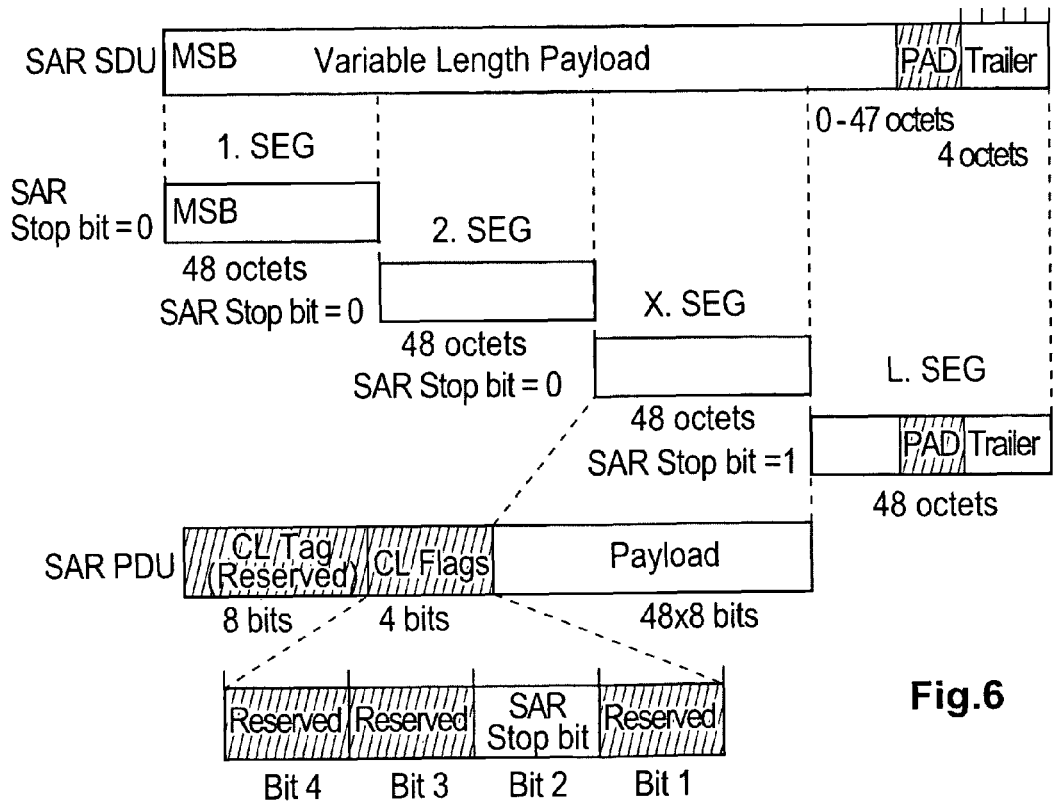
FIG. 6 shows a more detailed representation of the process steps for resegmenting the received data.

FIG. 6 shows the segmenting process in detail. It can be seen there that the SAR stop bit is set to 0 everywhere except for the segment containing the last payload data. It thus indicates which is the last data segment in the processed data unit.

The lower part of FIG. 5 further illustrates the processing step in the DLC layer 36. The data segments are supplied to the DLC layer individually. Processing of the data segment, which is designated the DLC-SDU from the start in the DLC layer, is complex and cannot be explained here in detail. As shown in FIG. 5, header and trailer information is added at the beginning and at the end respectively of each data segment. The trailer information may consist, for example, of an error correction code (FEC) which is recalculated in this layer. Alternatively, an error detection code (CRC) can be calculated. The header information contains for example information designating the type of the data (dummy/payload data). For further information about the processing of the data packets in the DLC layer, refer to the document ETSI TS 101 761-1 V1.1.2.1 (200/11) Broadband Radio Access Networks (BRAN); HIPERLAN Type 2; Data Link Control (DLC) Layer; Part 1: Basic Data Transport Functions.

FIG. 7 now shows the normal case of processing data packets received via an IEEE 1394 interface for forwarding via the HIPERLAN/2 interface. A transmission frame according to the HIPERLAN/2 transmission system has a length of 2 ms. This time period is indicated by vertical bars. Ideally exactly 16 IEEE 1394 bus packets are received in this period, since the transmission of the data is here segmented into 125 µs long bus cycles as standard. This is shown in the top part of FIG. 7. It is shown there that exactly 16 bus packets go into the transmission frame N. This applies to the isochronous data transport provided for in the IEEE 1394 standard. Accordingly, an IEEE 1394 bus packet is transmitted at time intervals of 125 µs. The start of a MAC transmission frame according to the HIPERLAN/2 standard is marked in FIG. 7 as BCH (broadcast channel) in each case.

Figure 10:
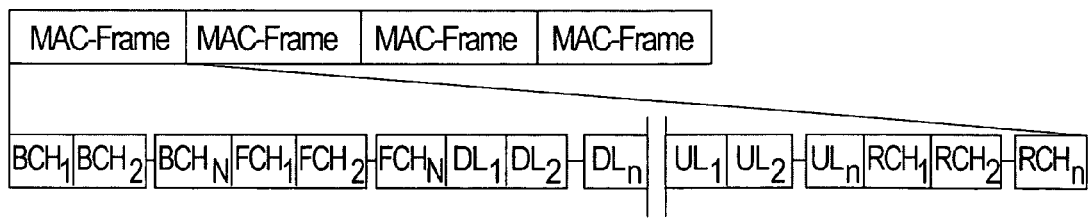
FIG. 10 shows the format of a HIPERLAN/2 MAC transmission frame.

FIG. 10 also shows the format of a HIPERLAN/2 MAC transmission frame. According to this figure, a transmission frame can have a number of broadcast channels (BCH 1 to BCH N), frame control channels (FCH 1 to FCH N), downlink channels (DL 1 to DL N), uplink channels (UL 1 to UL N) as well as random access channels (RCH 1 to RCH N).

The associated time slots of the transmission frame that are reserved for the transmitting station are indicated in the fourth part of FIG. 7 as AS (allocated slots).

In the second part of FIG. 7 it is shown in the transmission frame N+1 that the previously collected 1394 bus packets are processed en bloc, that is to say the processing takes place there as described above in connection with FIG. 5. If the reserved time slots AS have a sufficient distance from the start of the transmission frame N+1, the collected and processed data can already be transmitted via the air interface in the next transmission frame N+1. The third part of FIG. 7 further indicates that a certain amount of time can elapse between the completion of the processing according to FIG. 5 and transmission of the data via the air interface in order to prepare for the data transmission. It is shown in the transmission frame N+2 that the reserved time slots for the transmitting station have been shifted to a different position by the so-called "scheduler". According to the HIPERLAN/2 standard, this is possible during operation and would be notified in the frame control channel (FCH).

FIG. 8 shows the special case where the start of a seventeenth IEEE 1394 bus packet has also been received in the transmission frame N. This can occur due to slight deviations between the two clock systems for the IEEE 1394 bus system on the one hand and for the HIPERLAN/2 transmission system on the other hand. It would then not be possible to perform the SSCS-SDU data processing already after the sixteenth data packet has arrived. It is necessary to wait first for the seventeenth bus packet to arrive. It is therefore shown in the second part of FIG. 8 that the data processing is delayed in comparison with the previous case. As a result, the data can no longer be fully processed when the time slots AS reserved for the transmitting station are ready for transmission. In this case, a delay in data transmission would occur if the data processing were performed in compliance with the standard. The received data could then not be-transmitted until the next but one data transmission frame N+2. Since, moreover, a seventeenth bus packet has also been received, the space in the assigned time slots in one transmission frame would not be sufficient, and it would even be necessary to transmit the rest of the received data in transmission frame N+3, which is likewise illustrated in FIG. 8 by means of grey hatching.

The processing method according to the invention deviates from the process envisaged in the standard. It is illustrated schematically in FIG. 9. According to the IEEE 1394 standard, a 1394 bus packet can contain a complete MPEG transport packet with 188 bytes. With all additional information of the bus packet, the latter then has a length of 224 bytes. According to the invention, immediately after it has been received, said data packet is passed to the processing in the packet-based convergence layer 39. The processing steps in the sublayers SSCS, CPCS and SAR are thus performed directly after the respective bus packet has been received.

Processing of the received bus packet takes place concurrently with the receiving of further bus packets. For this purpose, the individual processing steps are supplied with their own clock signals and are controlled by the central microprocessor unit 38. For the sake of simplicity, in the second part of FIG. 9, the section-by-section processing of each received bus packet is represented in such a way that it always takes place between the reception of two successive bus packets. This is not however intended to give the false impression that, if necessary, this processing cannot be completed also during reception of the next bus packet.

The completed segmented data sections can each be forwarded immediately to the data link control layer (DLC) 36 since they are processed separately in the data link control layer in each case. Once the sixteenth data packet has arrived in the transmission frame N, therefore, no lengthy processing time arises for the reformatting of the data. It is then ensured that the reserved time slots for the transmitting unit can already be filled in the following transmission frame N+1 with the received data from the previous transmission frame. This reduces the maximum delay time envisaged by the HIPERLAN/2 standard by 2 ms to 4.1 ms.

If necessary, the time slots in the next transmission frame can also be missed if a seventeenth bus packet already falls within the first transmission frame. In order to ensure immediate transmission of the data in the next transmission frame here as well, as a further measure, it is possible to advance the time-slot pattern for the processing of the received bus packets slightly. Said time-slot pattern no longer matches the 2 ms time-slot pattern of the transmission frame. Although the 2 ms time interval is observed, the two time-slot patterns are slightly offset from one another. This measure is shown in FIG. 8. The dashed line there indicates the advance time of the processing time-slot pattern in each case. If a seventeenth bus packet was then also started in relation to the advanced processing time-slot pattern, this means that said packet has certainly arrived but before the end of the actual transmission frame, and consequently the processing can still be completed with certainty before the first reserved time slots become valid. The processing time-slot pattern must be advanced so far that a complete IEEE 1394 bus packet can still be received and additionally there is still enough time remaining to process this bus packet. The time slots for BCH, FCH, ACH and Preamble provided at the beginning of a transmission frame make a minimum time of 20+36+12+8=76 µs available. In order to enable any begun data packet still to be received and processed in this time, the advance time should therefore be about 49 µs.

There is still a problem that if the first reserved time slot has been missed, according to the HIPERLAN/2 standard, so-called dummy data must be transmitted in it. In the HIPERLAN/2 standard said data is termed dummy LCHs. The solution according to the invention now permits the free remaining reserved time slots still available to be utilized for transmitting payload data instead of the dummy data. Since the data of the received bus packets has already been immediately processed and prepared for transmission via the air interface, said data can then also be inserted into the available remaining reserved time slots. This is shown in the fourth part of FIG. 9. In said figure, there is a grey-hatched area in the area of the reserved time slots AS into which already processed data of the current transmission frame can be inserted. An implemented solution can be such that it is checked every time after four LCH channels whether data from the current transmission frame has been fully processed and it is then inserted into the remaining LCH time slots. This solution enables the available bandwidth to be better utilized so that further resources can be used for control information, e.g. for compensating synchronization differences.

If only the first described method of the section-by-section processing of the bus packets is implemented, in the case of an MPEG2 transport stream, the buffer memory can be dimensioned for approximately 70 fewer LCH time slots, which is equivalent to a size of 4480 bytes. In the case of a DVC transport stream, this advantage can even be 163 LCH packets, equivalent to 10,432 bytes.

The invention was explained with reference to the example of the transmission of data received via the IEEE 1394 bus and forwarded via a HIPERLAN/2 interface. It is however not solely restricted to this application. The invention can be deployed anywhere where data packets are received via a first interface and are transmitted again via a second interface in a different time-slot pattern.

What is claimed, is:

1. Method for processing data packets received via a first interface for outputting via a second interface, in which a specific time-slot pattern is observed for outputting the data via the second interface comprising:
   reformatting the data immediately after receiving one of the data packets falling within one time slot,
   wherein a specific number of received data packets falls within the time-slot pattern for the output of the data,
   wherein the output of the data via the second interface takes place in reserved time slots in accordance with the TDMA method, where TDMA stands for Time Division Multiplex Access, and
   wherein, in the case where a reserved time slot in a transmission frame has been missed, the still available reserved time slots of said transmission frame are filled up with the reformatted data that is already available.

2. Method according to claim 1, wherein a time-slot pattern that has been advanced by a given amount is used for internal processing of the received data packets instead of the output time-slot pattern.

3. Method according to claim 1, wherein reformatting the data comprises re-segmenting the received data.

4. Method according to claim 1, wherein the first interface corresponds to an IEEE 1394 interface and the second interface corresponds to a HIPERLAN interface for wireless transmission of data.

5. A device for processing data packets comprising: a first interface for receiving data packets, having a second interface for outputting the data packets, in which a specific time-slot pattern must be observed for outputting the data via the second interface, and a specific number of received data packets falls within the time-slot pattern for the output of the data, wherein the device comprises reformatting means which begin to perform a reformatting of the data immediately after receiving one of the data packets falling within one time slot,
   wherein the second interface for transmitting the data in reserved time slots is designed in accordance with the TDMA method, where TDMA stands for Time Division Multiplex Access, and
   wherein filling means are provided for the case where a reserved time slot in a transmission frame has been missed, which means filled up the still available reserved time slots of said transmission frame with the reformatted data that is already available.

6. A device for processing data packets comprising: a first interface for receiving data packets, having a second interface for outputting the data packets, in which a specific time-slot pattern must be observed for outputting the data via the second interface, and a specific number of received data packets falls within the time-slot pattern for the output of the data, wherein the device comprises reformatting means which begin to perform a reformatting of the data immediately after receiving one of the data packets falling within one time slot, wherein time-slot pattern adjustment means are provided which advance the output time-slot pattern for the internal, section-by-section reformatting of the data by a given amount.

7. Device according to claim 5, wherein the reformatting means have a processing step for resegmenting the received data.

8. Device according to claim 5, wherein the first interface corresponds to an IEEE 1394 interface and the second interface corresponds to a HIPERLAN interface for wireless transmission of data.

9. Method according to claim 2, wherein the time-slot pattern is advanced by the time required for receiving one data packet in the first time-slot pattern less the time reserved for transmission of protocol data at the beginning of a transmission frame of the output time-slot pattern.

10. Device according to claim 6, wherein the reformatting means have a processing step for resegmenting the received data.

11. Device according to claim 6, wherein the first interface corresponds to an IEEE 1394 interface and the second interface corresponds to a HIPERLAN interface for wireless transmission of data.

* * * * *